United States Patent
Cudak et al.

(10) Patent No.: US 10,372,779 B2
(45) Date of Patent: Aug. 6, 2019

(54) FREQUENT CONTENT CONTINUITY VISUAL ASSISTANCE IN CONTENT BROWSING

(75) Inventors: Gary D. Cudak, Creedmoor, NC (US); Christopher J. Hardee, Raleigh, NC (US); Randall C. Humes, Raleigh, NC (US); Ruthie D. Lyle, Durham, NC (US); Adam Roberts, Moncure, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 13/613,265

(22) Filed: Sep. 13, 2012

(65) Prior Publication Data

US 2014/0074989 A1 Mar. 13, 2014

(51) Int. Cl.
*G06F 15/16* (2006.01)
*G06F 16/957* (2019.01)

(52) U.S. Cl.
CPC ........ *G06F 16/9574* (2019.01); *G06F 16/957* (2019.01); *G06F 15/16* (2013.01)

(58) Field of Classification Search
CPC ........ H04H 60/33; H04H 60/00; G06F 15/16; G06F 15/173; G06F 17/00; G06F 17/30; G06F 3/00; G06F 3/14; G06F 12/00; G06F 3/048; G06F 3/04842; G06F 15/00; G06Q 20/20; G06Q 30/06
USPC .......................................... 709/213–219, 246
See application file for complete search history.

(56) References Cited

U.S. PATENT DOCUMENTS

| | | | |
|---|---|---|---|
| 5,893,908 A * | 4/1999 | Cullen et al. | |
| 5,898,836 A * | 4/1999 | Freivald et al. | 709/218 |
| 6,065,006 A * | 5/2000 | deCarmo et al. | |
| 6,085,229 A * | 7/2000 | Newman et al. | 709/203 |
| 6,157,381 A * | 12/2000 | Bates et al. | 715/786 |
| 6,789,170 B1 * | 9/2004 | Jacobs et al. | 711/133 |
| 6,820,116 B1 * | 11/2004 | Pyhalammi | G06F 17/30902 |
| | | | 707/E17.12 |
| 7,106,897 B1 * | 9/2006 | McIntyre et al. | 382/145 |
| 7,747,749 B1 * | 6/2010 | Erikson et al. | 709/226 |

(Continued)

OTHER PUBLICATIONS

Track Changes to Websites in Internet Explorer With Diff-IE (Add-on); Farshad; Dec. 14, 2010.*

*Primary Examiner* — Tauqir Hussain
*Assistant Examiner* — Boris D Grijalva Lobos
(74) *Attorney, Agent, or Firm* — Steven M. Greenberg, Esq.; Shutts & Bowen LLP

(57) ABSTRACT

Embodiments of the present invention provide a method, system and computer program product for frequent content retrieval in a content browser. In an embodiment of the invention, a method for frequent content retrieval in a content browser is provided. The method includes retrieving requested content from a content server from over a computer communications network and comparing the retrieved requested content to a cached version of the requested content. The retrieved requested content thereafter can be annotated to visually emphasize a frequently accessed portion of the retrieved requested content in response to a threshold difference between the retrieved requested content and the cached version. Finally, the annotated retrieved requested content can be returned to a content browser for display therein.

10 Claims, 1 Drawing Sheet

(56) References Cited

U.S. PATENT DOCUMENTS

| | | | |
|---|---|---|---|
| 8,104,044 B1* | 1/2012 | Scofield | G06F 9/4443 709/203 |
| 8,224,823 B1* | 7/2012 | Amacker | 707/736 |
| 8,560,964 B2* | 10/2013 | Dodson et al. | 715/819 |
| 2005/0240875 A1* | 10/2005 | Takayama et al. | 715/745 |
| 2006/0047651 A1* | 3/2006 | Milic-Frayling et al. | 707/5 |
| 2006/0075019 A1* | 4/2006 | Donovan et al. | 709/203 |
| 2006/0190483 A1* | 8/2006 | Takahashi et al. | 707/104.1 |
| 2006/0256083 A1* | 11/2006 | Rosenberg | 345/156 |
| 2007/0124693 A1* | 5/2007 | Dominowska et al. | 715/772 |
| 2008/0201651 A1* | 8/2008 | Hong et al. | 715/764 |
| 2009/0327914 A1 | 12/2009 | Adar et al. | |
| 2012/0240019 A1* | 9/2012 | Nuzzi | 715/205 |
| 2013/0007787 A1* | 1/2013 | John et al. | 725/10 |
| 2013/0144736 A1* | 6/2013 | Vodopia | 705/20 |
| 2013/0275850 A1* | 10/2013 | Cudak et al. | 715/234 |
| 2014/0109002 A1* | 4/2014 | Kimball et al. | 715/800 |

* cited by examiner

FREQUENT CONTENT CONTINUITY VISUAL ASSISTANCE IN CONTENT BROWSING

BACKGROUND OF THE INVENTION

Field of the Invention

The present invention relates to content browsing and more particularly to frequent content management in content browsing.

Description of the Related Art

The advent of the global Internet has facilitated access to an unimaginable quantity of information to even the most casual end user. Concurrently with the development of the Internet, developers have produced several content retrieval systems, most famously the world wide web (the "Web"). In the Web, just as in other content retrieval systems, content is stored in different content servers and retrieved into a content browser upon specifying a network location of the content within the content browser. Initially unique to the Web, however, was the notion of hyperlinking in which content pages incorporate activatable references—namely hyperlinks—such that the selection of a hyperlink in one content page led to the loading and display in the content browser of the content referenced by the hyperlink.

In the early years of the Web, Web content and its presentation remained static, with both the formatting and positioning of the content specified according to the hypertext markup language (HTML). As such, modifying either content or the presentation of the content in a Web page involved the direct editing of the Web page—a tedious and error prone process. As the Web has evolved, however, content is no longer static and often is defined according to dynamic methodologies, and programmatic code including scripts. Further, the content and presentation of a Web page are no longer composite elements of a Web page. Rather, the presentation has been separate from the content, most notably through the use of style sheets and other templated presentation technologies. Consequently, while content itself can remain static, the layout of the content in a Web page, or within a Web site can change quite often.

Given the vast expanse of the Web and other content repositories, several mechanisms have been developed for end users to repeatedly retrieve content of interest. Ranging from the venerable "bookmark" to the more sophisticated subscription oriented aggregative technologies such as portals and syndicated feeds, these frequent content retrieval mechanisms render the Web more manageable for end users. Even still, frequent content is not merely limited to a page of content, but often frequent content is more granular in nature such as a particular portion of a page of content, or even just a display field in a page of content. Thus, while the page itself may remain constant over time, the presentation and layout of a page can change so as to displace content of interest thereby obscuring its location from the end user. In that circumstance, conventional frequent content retrieval mechanisms will have failed.

BRIEF SUMMARY OF THE INVENTION

Embodiments of the present invention address deficiencies of the art in respect to content browsing and provide a novel and non-obvious method, system and computer program product for frequent content retrieval in a content browser. In an embodiment of the invention, a method for frequent content retrieval in a content browser is provided. The method includes retrieving requested content from a content server from over a computer communications network and comparing the retrieved requested content to a cached version of the requested content. The retrieved requested content thereafter can be annotated to visually emphasize a frequently accessed portion of the retrieved requested content in response to a threshold difference between the retrieved requested content and the cached version. Finally, the annotated retrieved requested content can be returned to a content browser for display therein.

In one aspect of the embodiment, the content is a Web page and the content browser is a Web browser. In another aspect of the embodiment, the annotation is a change in display attributes of text of the frequently accessed portion. In yet another aspect of the embodiment, the frequently accessed portion is a hyperlink. In even yet another aspect of the embodiment, the annotating includes detecting a threshold difference between the retrieved requested content and the cached version, identifying a frequently accessed portion of the cached version, locating the frequently accessed portion in the retrieved requested content and annotating the retrieved requested content to visually emphasize the frequently accessed portion.

In another embodiment of the invention, a content browsing data processing system is configured for frequent content retrieval. The system includes a host computer with memory and at least one processor. The host computer is communicatively coupled to at least one content server from over a computer communications network. The system also includes a frequent content retrieval module executing in the memory of the host computer and coupled to a content browser and a page cache. The module includes program code enabled upon execution in the host computer to retrieve requested content from a content server from over the computer communications network, to compare the retrieved requested content to a cached version of the requested content in the page cache, to annotate the retrieved requested content to visually emphasize a frequently accessed portion of the retrieved requested content in response to a threshold difference between the retrieved requested content and the cached version, and to return the annotated retrieved requested content to the content browser for display therein.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for frequent content retrieval in a content browser. In accordance with an embodiment of the invention, a portion of or an entirety of a page of content can be cached upon retrieval in a content browser. One or more corresponding frequented elements of the cached page or portion of the page can be stored in association with the cached content. Thereafter, upon subsequent retrieval of the page of content, the cached page or portion of the page can be compared to a corresponding portion of the subsequently retrieved page or portion of the page of content. To the extent that the page or portion of the page is determined to have changed based upon the comparison, the page or portion of the page can be parsed to locate the frequented elements of the page of content. Finally, the located frequented elements can be visually emphasized in the retrieved page of content so as to alert the end user of the new positioning of the frequented elements in the retrieved page of content.

Figure 1:
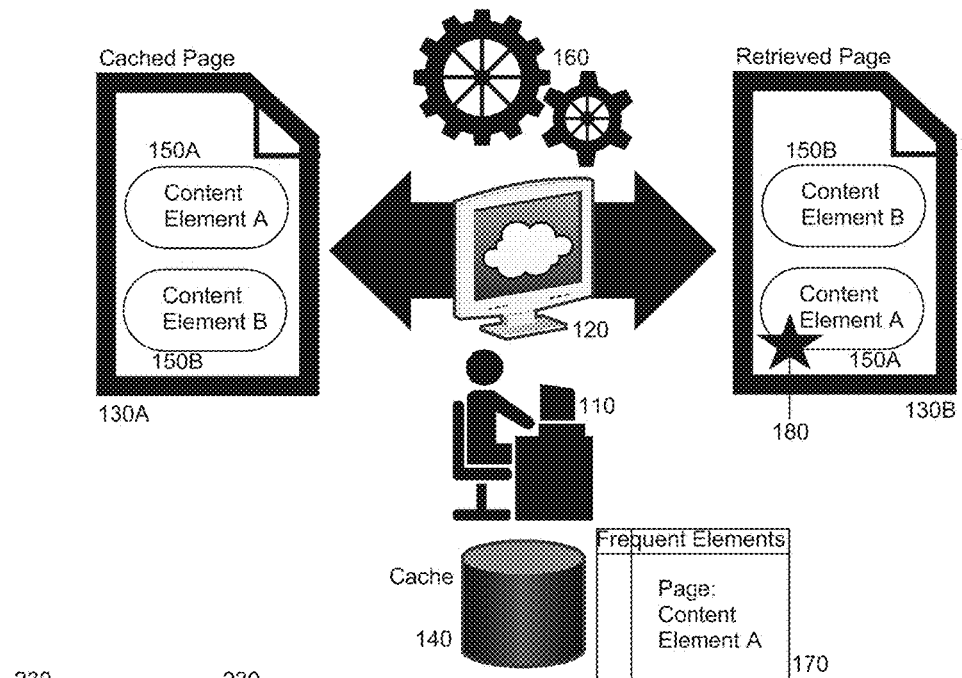
FIG. 1 is a pictorial illustration of a process for frequent content retrieval in a content browser.

In further illustration, FIG. 1 is a pictorial illustration of a process for frequent content retrieval in a content browser. As shown in FIG. 1, a page of content 130A can be cached in a cache 140 subsequent to retrieval by an end user 110 directing the rendering of the page of content 130A in a content browser 120. One or more content elements 150A, 150B of the page of content 130A can be processed by frequent content logic 160 in order to identify frequently accessed content 150A, such as a hyperlink in the page of content 130A frequently activated by the end user 110, or a text input field with which the end user 110 frequently interacts in the page of content 130A. Frequently accessed content 150A for the page of content 130A can be stored in a table 170 in connection with the cached page of content 130A in the cache 140.

Thereafter, when a page of content 130B is retrieved and determined to be a more recent form of the page of content 130A, the frequent content logic 160 can determine if the page of content 130B differs from the page of content 130A stored in the cache 140. If so, the frequent content logic 160 can locate within the page of content 130B the frequently accessed content 150A and a visual annotation 180 can be placed within the page of content 130B. For instance, the visual annotation 180 can be a separate graphical element or icon displayed in association with the frequently accessed content 150A, or a highlighting attribute of the frequently accessed content 150A such as an enlarged font of text associated with the frequently accessed content 150A, underlining or bolding of a font of text associated with the frequently accessed content 150A, or a different font background or foreground color of text associated with the frequently accessed content 150A. In this way, when the page of content 130B is rendered in the content browser 120, visual attention can be drawn to the new location of the frequently accessed content 150A in the page of content 130B.

Figure 2:
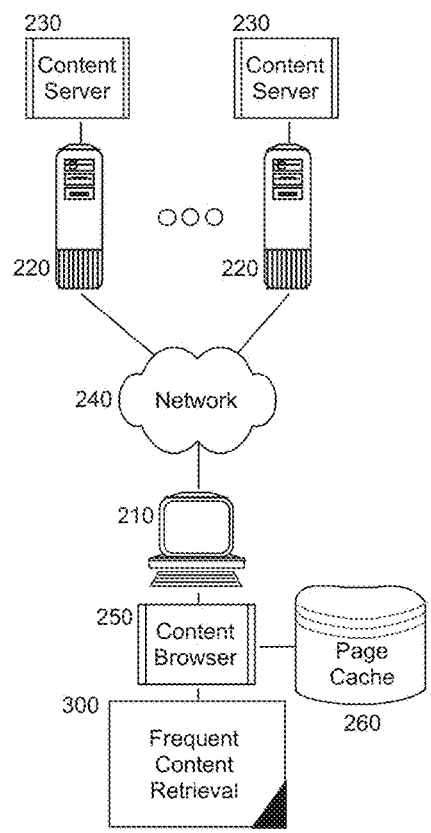
FIG. 2 is a schematic illustration of a content browsing data processing system configured for frequent content retrieval; and, FIG. 3 is a flow chart illustrating a process for frequent content retrieval in a content browser.

The process described in connection with FIG. 1 can be implemented within a computer data processing system. In yet further illustration, FIG. 2 schematically shows a content browsing data processing system configured for frequent content retrieval. The system can include a host computer 210 with memory and at least one processor configured for communicative coupling to different servers 220 over computer communications network 240, for example the global Internet. The host computer 210 can support the execution in memory thereof of a content browser 250 such as a Web browser enabled to retrieve and render different pages of content served by content servers 230 in respectively different ones of the serves 220 from over the computer communications network 240.

Frequent content retrieval module 300 can be coupled to the content browser 250. Optionally, as shown in FIG. 2, the module 300 can execute within the same host computer 210 as the content browser 250, though the module 300 also can execute separately from the content browser 250 in a different computer. In either case, the frequent content retrieval module 300 can include program code that when executed in memory by a computer can compare a received page of content (or a portion of a received page of content) to a corresponding cached version of the received page of content or portion thereof disposed in page cache 260. To the extent that the respective pages differ by a threshold amount, one or more frequently accessed page elements can be located within the received page or portion thereof and the page or portion thereof can be annotated to visually draw attention to the frequently accessed page elements.

Figure 3:
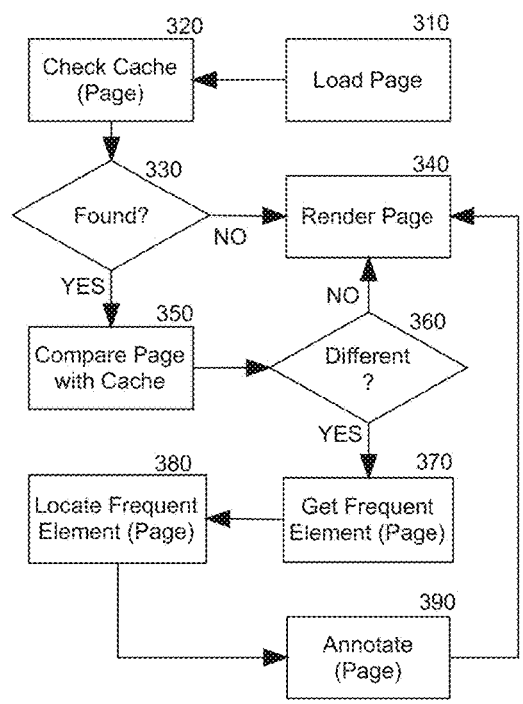

In even yet further illustration of the operation of the frequent content retrieval module 300, FIG. 3 is a flow chart illustrating a process for frequent content retrieval in a content browser. Beginning in block 310, a page can be loaded into memory in response to a directive to retrieve the page from a remotely disposed content repository such as a Web site. In block 320, a cache can be consulted to determine if a version of the retrieved page persists in the cache. In decision block 330, it can be determined whether or not the page can be located in the cache. If not, in block 340 the retrieved can be rendered in a content browser. Otherwise, the process can continue through block 350.

In block 330, if the page can be located in the cache, in block 350 the retrieved page and the cached version of the page can be compared to one another. In decision block 360, if the pages do not differ from one another beyond a threshold degree, in block 340 the retrieved page can be rendered in the content browser. Otherwise, in block 370 a frequent element can be identified for the cached page and in block 380, the identified frequent element can be located within the retrieved page. Thereafter, in block 390 the retrieved page can be annotated to visually distinguish the frequent element in the retrieved page. For example, an iconic or textual element can be placed proximate to the frequent element in the page so as to draw attention to the frequent element, or the display characteristics of the frequent element can be modified, for example by enlarging a font size, varying a font color, or decorating text of the frequent element through underlining or bolding.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for frequent content retrieval in a content browser, the method comprising:

retrieving requested content from a content server from over a computer communications network;

consulting a cache to determine if a cached version of the requested content persists in the cache;

in response to the consulting, comparing the retrieved requested content to a cached version of the requested content;

computing whether or not the retrieved requested content differs from the cached version by at least a threshold amount; and, on condition that the retrieved requested content differs from the cached version by at least a threshold amount, identifying in the cached version of the requested content, a portion of the cached version of the requested content specified as frequently accessed, the portion comprising a hyperlink, locating the portion of the cached version of the requested content in the retrieved requested content, annotating the retrieved requested content to visually emphasize the located frequently accessed portion of the retrieved requested content and, returning the annotated retrieved requested content to a content browser for display therein.

2. The method of claim 1, wherein the content is a Web page and the content browser is a Web browser.

3. The method of claim 1, wherein the annotation is a change in display attributes of text of the frequently accessed portion.

4. A content browsing data processing system configured for frequent content retrieval, the system comprising:

a host computer with memory and at least one processor, the host computer communicatively coupled to at least one content server from over a computer communications network; and, a frequent content retrieval module executing in the memory of the host computer and coupled to a content browser and a page cache, the module comprising program code enabled upon execution in the host computer to retrieve requested content from a content server from over the computer communications network, to consult a cache to determine if a cached version of the requested content persists in the cache, in response to the consulting, to compare the retrieved requested content to a cached version of the requested content in the page cache, to compute whether or not the retrieved requested content differs from the cached version by at least a threshold amount, and on condition that the retrieved requested content differs from the cached version by at least a threshold amount, to identify in the cached version of the requested content, a portion of the cached version of the requested content specified as frequently accessed, the portion comprising a hyperlink to locate the portion of the cached version of the requested content in the retrieved requested content, to annotate the retrieved requested content to visually emphasize the located frequently accessed portion of the retrieved requested content, and to return the annotated retrieved requested content to the content browser for display therein.

5. The system of claim 4, wherein the frequent content retrieval module and the content browser both execute in the memory of the host computer.

6. The system of claim 4, wherein the content is a Web page and the content browser is a Web browser.

7. The system of claim 4, wherein the annotation is a change in display attributes of text of the frequently accessed portion.

8. A computer program product for frequent content retrieval in a content browser, the computer program product comprising:

a non-transitory computer readable storage medium comprising a device having computer readable program code embodied therewith, the computer readable program code comprising:

computer readable program code for retrieving requested content from a content server from over a computer communications network;

computer readable program code for consulting a cache to determine if a cached version of the requested content persists in the cache;

computer readable program code for, in response to the consulting, comparing the retrieved requested content to a cached version of the requested content;

computer readable program code for computing whether or not the retrieved requested content differs from the cached version by at least a threshold amount; and computer readable program code for, on condition that the retrieved requested content differs from the cached version by at least a threshold amount, identifying in the cached version of the requested content, a portion of the cached version of the requested content specified as frequently accessed, the portion comprising a hyperlink, locating the portion of the cached version of the requested content in the retrieved requested content, annotating the retrieved requested content to visually emphasize the located frequently accessed portion of the retrieved requested content and, returning the annotated retrieved requested content to a content browser for display therein.

9. The computer program product of claim 8, wherein the content is a Web page and the content browser is a Web browser.

10. The computer program product of claim 8, wherein the annotation is a change in display attributes of text of the frequently accessed portion.

* * * * *